Dec. 2, 1947.  G. B. POLLOCK  2,431,825
MEDICO-SURGICAL PHOTOGRAPHIC DEVICE
Filed April 10, 1944  4 Sheets-Sheet 1

Gordon B. Pollock,
INVENTOR.

BY Copeland
ATTORNEY.

Dec. 2, 1947.   G. B. POLLOCK   2,431,825
MEDICO-SURGICAL PHOTOGRAPHIC DEVICE
Filed April 10, 1944   4 Sheets-Sheet 3

GORDON B. POLLOCK,
INVENTOR.

BY Copeland

ATTORNEY.

Dec. 2, 1947.  G. B. POLLOCK  2,431,825
MEDICO-SURGICAL PHOTOGRAPHIC DEVICE
Filed April 10, 1944  4 Sheets-Sheet 4

GORDON B. POLLOCK,
INVENTOR.

BY Copeland
ATTORNEY.

Patented Dec. 2, 1947

2,431,825

UNITED STATES PATENT OFFICE 2,431,825

MEDICO-SURGICAL PHOTOGRAPHIC DEVICE

Gordon B. Pollock, South Laguna, Calif.

Application April 10, 1944, Serial No. 530,302

10 Claims. (Cl. 95—11)

This application relates to a photographic device, and pertains particularly to a device adapted for use in surgical or clinical photography.

One of the particular objects is to provide a construction in which a non-sterile camera device may be brought into close proximity to the subject to be photographed, while maintaining said camera in a condition of sterility with respect to said subject.

A further object of the invention is to provide a camera construction adapted for medico-surgical use which is characterized by a sterilizable structure provided with a compartment adapted to receive a camera and a source of illumination, said compartment being defined at least in part by a transparent wall member through which the illumination is directed upon the photographic subject, such wall member being thus disposed in a protective relation with respect to the patient whereby injury to such patient as from a bursting flash-bulb or the like is prevented.

A further object is to provide a camera construction adapted for use relatively close to a photographic subject, which provides a photographic register means and a source of subject-illumination in a self-contained and sterilly isolated arrangement.

In connection with the above-expressed object; the device is preferably also featured by a substantially enclosed construction in which the self-contained subject-illuminating accessory is positioned to supply the entire volume of light to be used in producing the desired photographic result, and in which a relatively large opening is provided through which the operator may examine the area to be photographed, such opening being so arranged with respect to the position of the operators' body that such body will effectively serve as a light shield which excludes from the subject area detrimental extraneous light from sources of light within the room or space in which the device is used, whereby adverse illumination of the subject area is avoided.

A further object of the invention is to provide a photographic device adapted for use in surgical or clinical photography which is capable of producing very high quality photographic records with a minimum of effort and experience on the part of the operator, wherefore it may be used by substantially anyone after a minimum of instruction in the mechanics of the operation.

Clinical photography appears to be becoming more and more important in medical and surgical practice. The larger hospitals, both civilian and military, frequently provide a photographic staff with a large array of equipment just for this purpose. The usual procedure is to set up the camera at a relatively great distance from the patient who constitutes the photographic subject, and to use a rather long focal length lens to produce the desired photographic register. The placement of the camera at a distance from the subject is dictated by fact that the camera is a non-sterile object, and the use of a long focal length lens is dictated by the usual requirement of obtaining a rather enlarged or "close-up" view. These requirements obviously complicate the picture-taking procedure, and frequently require rather elaborate lighting arrangements, which add to the confusion of the operating room. Furthermore, particularly in the production of photographic records of surgical operations, the necessity for minimizing delay in the progress of the operation places a requirement upon the photographer to work quite hastily, which often results in inferior photographic results.

With the use of the device of the present invention, it is merely necessary for a nurse, doctor or other person present (no matter how unskilled in photography) to reach for the sterile photographic device, hold or place it in proper proximity to the area to be photographed in the optimum photographic position, push a button, and set the device aside. The whole procedure, by actual test, may be accomplished in less than 15 seconds. This convenience of use, together with the very short delay obtaining, makes the device of particular utility in Army and Navy field operations, where elaborate equipment is almost never available.

In connection with the above, it is well known that photography in so-called "natural color" as by use of "Kodachrome" film is successful from a color-rendition standpoint only when a very precise photographic exposure is obtained. Heretofore, in medico-surgical practice where "Kodachrome" pictures are attempted, a very careful appraisal of the illumination of the subject is attempted, and this not only requires considerable time as a general rule, but is usually only approximate at best, and the production of a good color record becomes more often a matter of fortuitous circumstance. According to a preferred embodiment of this invention, wherein the construction is provided with a self-contained illuminating unit of substantially uniform lighting characteristics, and the camera shutter speed of the associated camera can be pre-set to a given value, the proper exposure of the color film becomes merely a matter of proper placement of the camera and illuminator positions of the structure at a given distance from the subject. This control is readily attained in the use of the present device by visually spacing the structure a predetermined given distance from the subject (usually rather close to the subject, wherefore close approximation may be made by an unskilled operator), and operating the device. Predetermined shutter-speed, plus predetermined illumination at a predetermined distance, all constants, produce the desired predetermined and correct exposure of the photosensitive surface, and correct color rendition is assured. For this reason, the use of color film is brought within the scope of a most unskilled operator, benefiting the medico-surgical arts to an extent hitherto unattainable.

The most usual photographic situation obtaining in medico-surgical photography is that wherein the subject is lying on a table or the like, as in surgery, and the photograph is to be taken along a generally vertical line. The device of this invention is therefore preferably adapted particularly for use in this position, and to this end the device is provided with a three-point suspension system wherein one end of the device is supported by the forehead of the user and the other end is supported manually.

The device is also useful in ordinary medical practice, as by dentists, nose, throat and ear doctors, who wish to retain clinical records of their cases. Its ready use, together with the substantial infallibility of results, makes it particularly advantageous in the photography of animal cases, as in veterinarian practice, where the subject is frequently rather non-cooperative.

In view of the above, it is one of the important objects of this invention to provide a photographic device comprising a heat resistant casing member (the expression "heat resistant" being intended to denote that degree of resistance to heat damage occasioned by the degree of heat employed in heat-sterilization) adapted for complete sterilization in any suitable manner (as by means of an autoclave), provided with a compartment which is adapted to receive a non-sterile camera member in a relation such that when the device is placed in a desired position with respect to the photographic subject the camera member is properly positioned to obtain the desired photographic result, and is completely isolated from the photographic subject.

Other objects and features of the invention will be apparent from the ensuing description of certain illustrative embodiments thereof, or will be apparent from such description. These embodiments are illustrated in the accompanying drawings, in which:

Referring to the drawings, the device may comprise a casing 1 of substantially rectangular cross section, provided with an open lower end 2. At the upper end of the casing 1 I provide a compartment 3 provided with a cover 4 hinged as at 5. The cover 4 is preferably of rather large expanse, so that when swung away (in a counter-clockwise direction in Fig. 1) a relatively large opening is provided for compartment 3 through which the camera element 6 may be inserted. The camera illustrated in connection with this application may correspond generally to the type of camera shown in my issued Patent No. 2,364,652, entitled "Camera construction." This particular camera is illustrated for convenience only, and it will be appreciated that any comparable camera of equivalent utility may be substituted therefor, provided necessary modifications in the structural assembly are made for the purpose of properly aligning the photographic axis of the camera with the subject area under consideration. Any suitable locking device may be provided for fixing the cover 4 in position, a convenient type of locking member for holding the cover in closed position being indicated at 7 and comprising a pivotally mounted knob 7a secured to the cover 4 and adapted to engage a taper-head pin 7b secured to the main body portion of the casing 1. In one rotative position of the knob 7a the pin 7b will be dis-engaged and the cover subject to the opening movement, the knob 7a being so constructed that a comparatively minor rotative movement thereof will engage the pin 7b when desired.

A suitable method of securing the camera within compartment 3 may comprise a rectangular channel member 8 formed as a portion of the casing 1 and adapted to receive the base portion 6a of the camera 6, together with a suitable holding screw or the like 9 terminating in an operating knob 10 which may be adapted to engage a co-actingly threaded recess in the camera base and positively clamp the camera against the member 8. The proper fixation of the camera will be such as to arrange the photographic axis of the camera (indicated by the dot-dash line A) in a position extending longitudinally of casing 1. In the present-described form of the invention, wherein a self-contained illuminating system is provided for the device, the axis A is preferably disposed slightly to one side of the middle of the casing 1, in order to provide ample space for the location of the illuminating system, but it will be appreciated that the prescribed placement of this photographic axis is not essential to the invention.

Figures 3, 4, 8:
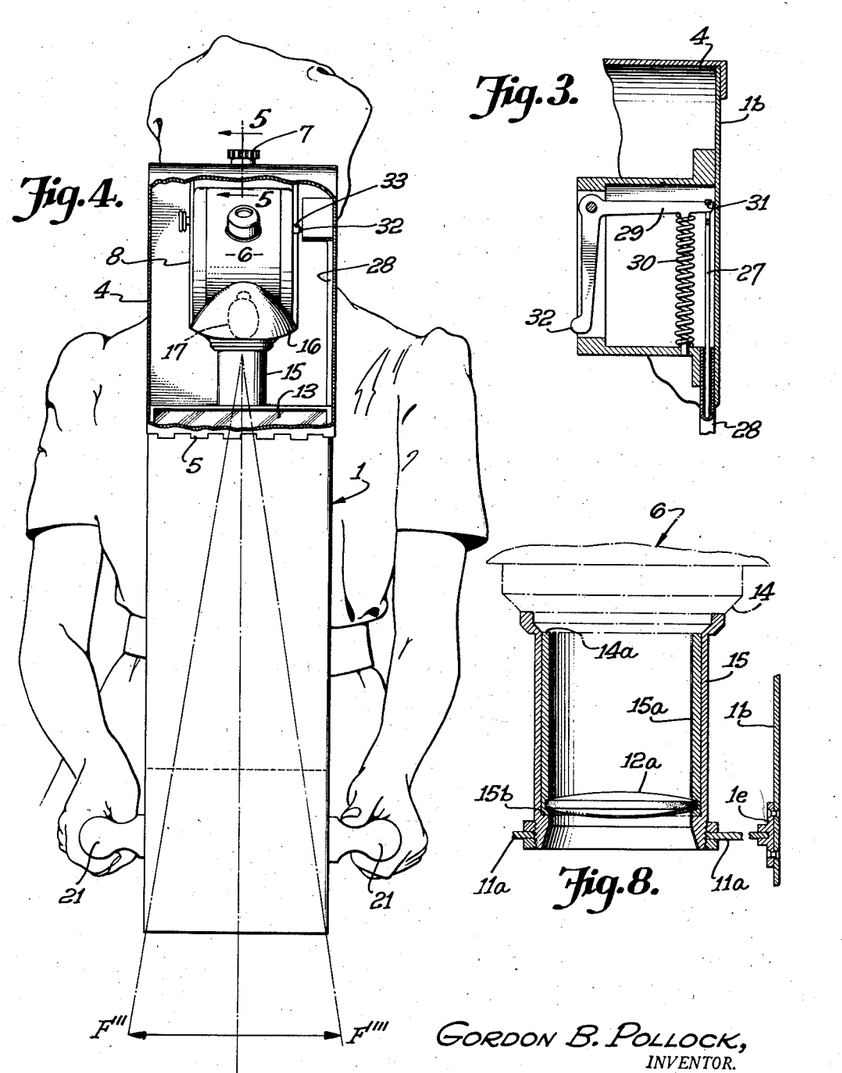
Fig. 4 is a front view thereof, showing the upper portion of the device partly broken away.
Fig. 8 is a sectional detail of a modified structure, as taken on line 8—8 in Fig. 1.
Figure 6:
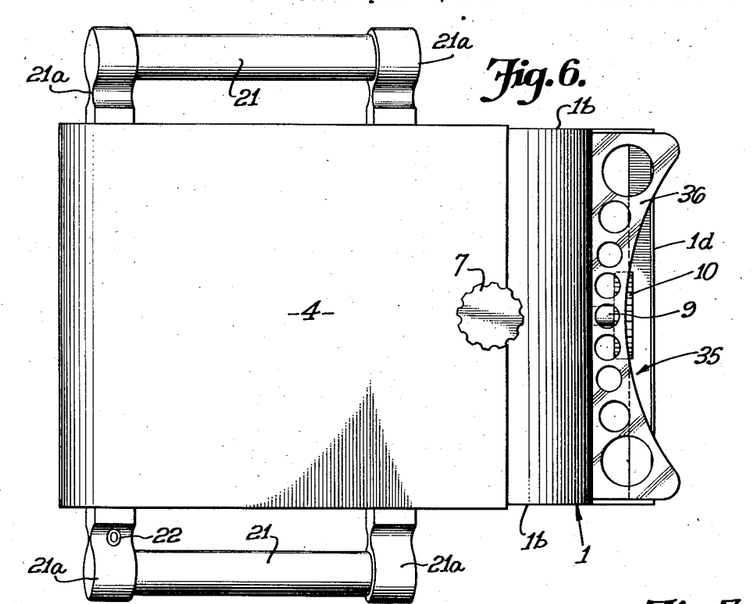
Fig. 6 is a plan section, taken on line 6—6 in Fig. 1.

The compartment 3 is further defined by a wall or partition 11 extending transversely across the casing 1 at a position somewhat below the location of the camera 6. The wall 11 is provided with window means through which the picture is taken by the camera 6, and in the preferred embodiment such window means will also provide for transmission of the illumination used in the photographic operation. This wall may comprise an opaque section 11a, a transparent window section 11b arranged substantially symmetrically with respect to the axis A, and a clear window section 11c. The light-transmitting wall elements 12 and 13 provided at the respective window sections 11b and 11c are advantageously formed of a heat-resistant glass which is capable of withstanding the temperatures and temperature changes encountered in an autoclave sterilization process or the like. Furthermore, the window element 12 may comprise a positive lens of a formula such as to cooperate with the lens system of camera 6 to enable it to focus at a desired plane with respect to the open lower end 2 of the casing. This lens would correspond in function to a conventional "portrait" lens which may be provided for the conventional camera in order to use the same for "close-up" photographs. I further preferably provide a light-seal between the front 14 of the camera 6 and the window 11b, as at 15, which will function as a shielding means to exclude from the camera any stray reflections from the light source located within compartment 3. The member 15 may comprise a tube or the like, mounted on the wall 11, against the upper open end of which the front of the lens mount may fit, if desired. If desired, the window section 11b may be made removable, for separate sterilization, as, for example, where such window section comprises a lens or the like which may not advantageously be subjected to heat-sterilization. Such a removable window section is shown in Fig. 8, wherein a lens member 12a is mounted on a tube 15a slidably disposed within the member 15 and adapted to rest against a stop shoulder 15b formed on the lower end of the number 15, the upper end of the tube 15a being adapted for engagement by the front 14 of the camera 6, as at 14a to prevent upward dislocation of such tube 15a. As further shown in Fig. 8, the wall member 11a may be secured to the walls of the casing 1 (as to the wall 1b, through the agency of channel members or the like, as shown at 1e.

The source of illumination for the production of the desired photographic result may conveniently comprise of reflector element 16 secured to camera 6, within which a flash bulb 17 may be mounted, as in a suitable receptacle 18 provided in the housing of the camera 6. The operation of the flash bulb, it will be understood, is controlled within the camera for the desired synchronization with respect to the shutter operation. The location of the transparent window portion 11c will be such that the light from the source 17 will fall substantially uniformly across the lower end 2 of the casing, preferably quite symmetrically with respect to the axis A.

Figures 1, 2, 5:
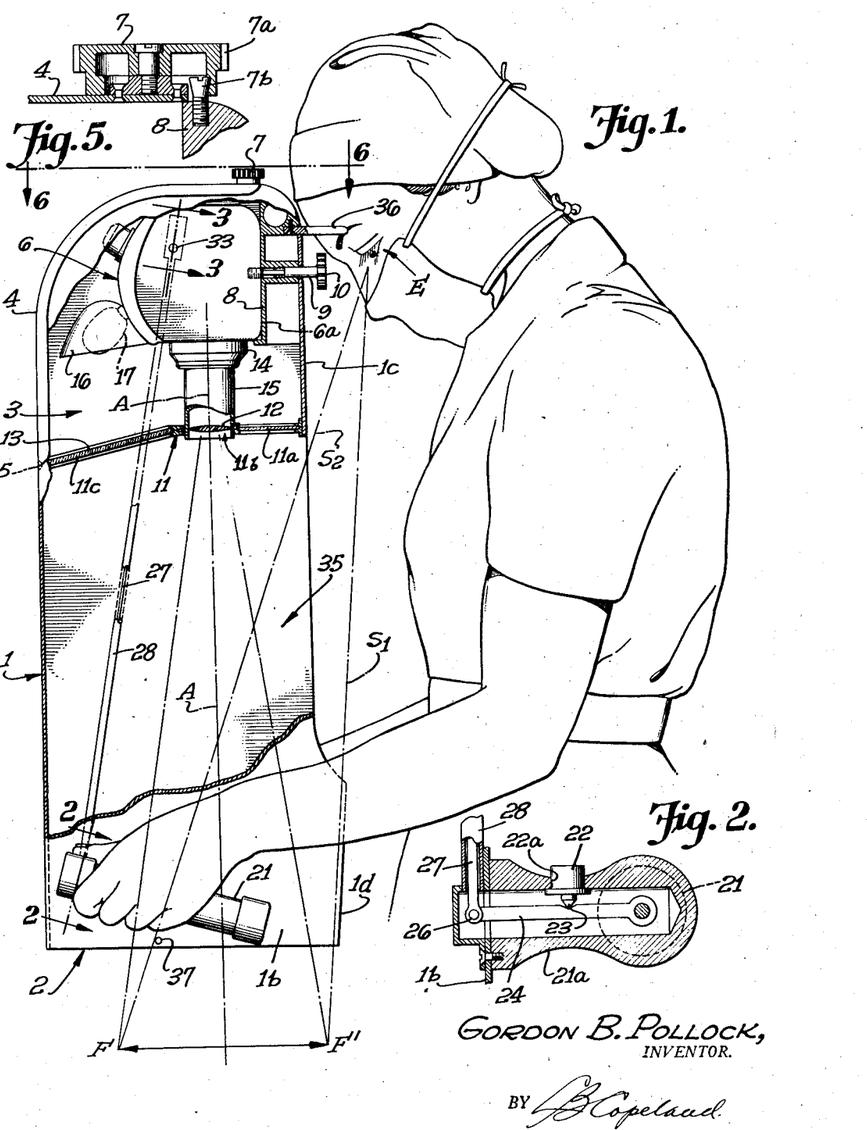
Fig. 1 is a side view of the device, partly broken away, showing the same in actual use.
Figs. 2 and 3 are details of the exterior portions of a form of camera release mechanism which may be employed, as taken on line 2—2 and 3—3, respectively, in Fig. 1.
Fig. 5 is a detail of a portion thereof, taken in line 5—5 in Fig. 4.

Suitable means for holding the device when a photograph is being taken or preferably provided. Such means may comprise a pair of handles 21 at the left and right sides of the device near the lower end thereof, somewhat as shown, cooperating with a head support member 36 at the upper end. I preferably locate a trigger or the like which may be used to cause the camera 6 to be operated in the production of a given exposure, and this trigger mechanism is preferably located adjacent or upon one of the handles 21. In Figs. 2 and 3 are illustrated a construction comprising a push button 22 slidably mounted within a co-acting recess 22a in one of the arms 21a which support the handle 21, the inner end of said push button being provided with a bearing portion 23 adapted to engage a lever 24 pivotally-mounted at its outer end 25 to the body portion of the handle 21a and carrying at its inner end 26 a pull rod 27 located interiorly of the casing 3 and extending upwardly along the sidewall 1b thereof through a protecting tube 28 into the compartment C. At the upper end of the push rod 27 I provide a pivotally-mounted crank 29 having a horizontal portion biased upwardly as by a spring 30 and adapted to be engaged by the push rod 27 as at 31, and a depending portion 32 adapted to engage the release button 33 of the camera 6. This mechanism will result in a thrust upon the release button 33 through the crank arm 29 when the thumb button 22 is depressed by the user.

Figure 7:
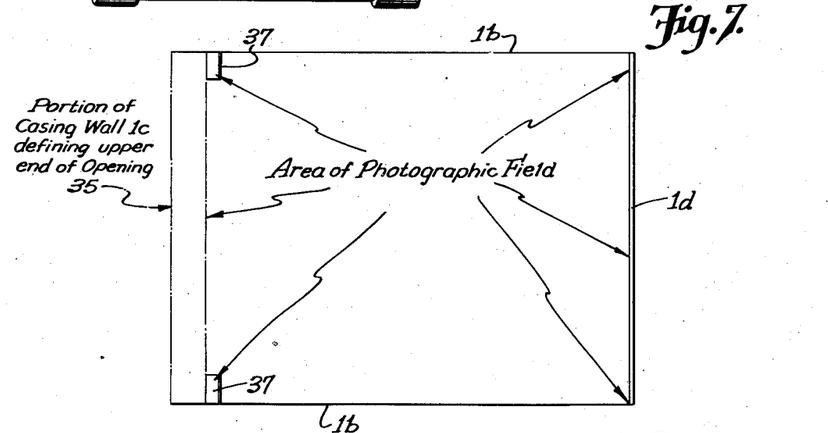
Fig. 7 illustrates the field-of-view of the operator of the device, as taken from an eyepoint corresponding to that of the operator shown in Fig. 1.

The side of the casing 1 nearest the operator, as designated by the reference numeral 1c, is left open from a position below the wall 11 to a position near the lower end 2 of said casing. The aperture 35 thus formed serves as a viewing aperture through which the user may examine the area to be photographed. In this connection, I preferably arrange the terminal wall portion 1d of the casing side 1c so that it will cooperate with the viewing opening 35 to define the field of view of the camera 6 for the eye of the observer. To accomplish this I incline the wall portion 1d upwardly and outwardly as shown in Fig. 1, the angularity being so selected that an upward prolongation of the wall portion 1d will intersect the eye position E of observer. In order to assist the user or operator of the device in the proper placement of his eye at the eye point E, and to cooperate with the handle means 21 in the support of the device in position, I provide a head rest 36 secured to the casing 1 adjacent to the upper end thereof, against which the user may rest his forehead as shown in Fig. 1. When using the device, the operator sights along the line defined by the wall portion 1d (dot-dash line $S_1$) a projection of which will define the near edge of the field of view of the camera 6 (as at F" Fig. 1). This projection is indicated below the open end 2 of the casing, and depending upon the actual focus of the objective used in the camera 6, may be located at any desired spacing with respect to the lower end of the casing 1. In this particular embodiment, I have indicated the focus plane of the camera 6 as being along the line F—F' (F"—F'" in Fig. 4), some 3 inches below the lower edge of the casing 1. In order that the user will be able to determine the upper or outer limits of the camera field, I may provide a pair of pins 37 secured to the side walls 1b of the casing at the lower end thereof, spaced from the wall portion 7d in such position that the line of sight $S_2$ from the eye point E past the pins 37 will fall at the outer limits of the camera field (see Figs. 1 and 7). It will be appreciated that different users will establish the eye point E at slightly different positions, depending upon the shape of the operator's head, the position at which the forehead is rested against the rest 36 and the like. Minor variation of the eye point E will not make a significant difference in the result obtained by the camera, and it has been found that the inclined wall portion 1d, together with the head rest 36, will enable a sufficiently accurate positioning under all conditions.

The procedure for utilizing the camera construction involves the loading of the camera into the compartment 3 and the subsequent exposure of the desired area. The casing 1 (without the camera in place) will have been sterilized in any suitable manner, by an autoclaving, and the door 4 is then opened by a sterile attendant. The camera 6 is then placed in position within the compartment 3 by another attendant, and the sterile attendant will tighten the knob 10 to fix the camera in proper position. It will be appreciated that the camera 6 will have been pre-set and in condition to be ready to take a picture on release of the shutter-release button 33, and will be supplied with a flash bulb 17. The sterile attendant then closes the door 4 and locks the knob 7 and the camera device is then ready for immediate use. The interior of compartment 3 will have become non-sterile due to the placement of the non-sterile camera therewithin, but this is of no moment to the use of the device inasmuch as this non-sterile condition is confined to the interior of this compartment. When it is desired that the camera be used in the production of a photographic record, the nurse, surgeon or other person present in the vicinity of the patient is merely required to pick the device up by the handles 21, place her or his forehead against the rest 36 and sight downwardly through the opening 35 upon the area of which a record is desired. The lower end of the casing 1 may be held about 3 inches from the subject, in the relationship shown in Fig. 1 (dependent, of course, upon the photographic objective system employed), and when the desired area is encompassed within the field of view, the thumb button 22 is depressed which causes the camera shutter to open and the flash bulb 17 to act in synchronism therewith. The picture-taking procedure is then complete and the device may be set to one side. At a convenient later time the device is removed from the operating room, or the camera is removed from the compartment 3 in the operating room, depending upon whether or not a sterile situation must be maintained, and the camera is then re-set for further use. After the camera is removed from the compartment 3, the entire casing may again be sterilized and made ready for re-use.

It will be appreciated that in an ordinary operating room there are usually a number of rather high-powered sources of illumination present which would throw adverse lighting upon the subject area in the normal situation. The fact that the major portion of the casing 1 is composed of solid walls which will exclude a great proportion of the light which ordinarily would fall upon the subject area F—F' is of considerable assistance in preventing stray or unwanted light from falling on the subject. This results in the illumination being obtained substantially wholly from the flash bulb 17, which insures a standardized exposure of the subject provided the camera shutter is properly timed with respect to this flash bulb. The production of standardized illumination upon the subject area is of particular advantage where natural-color films (such as "Kodachrome") are employed. As is well known, this type of film provides correct color rendition only when the proper exposure has been produced. The opening 35 in the near wall of the casing 3 is for the most part shielded by the body of the operator using the device, and inasmuch as this operator has the field of view F—F' before him at the time of the exposure he can insure that there be no strong illumination from any extraneous source at the moment of exposure. This has been found to be quite conveniently attained on the part of the operator by hunching his shoulders to one side or the other or otherwise suitably moving his body to exclude the light which is causing the difficulty. Minor amounts of light which would fall sideways beneath the lower end of the casing will of course be quite insignificant compared with the intensity of the light produced by the flash bulb 17, and this sideways light serves merely to illuminate the area to an extent such that the operator can determine whether the desired field of view has been secured.

When a removable window element is provided at 11b (either a lens or a piece of plane glass may be used in this relation), as shown in Fig. 8, the tube 15a which may be formed of plastic or the like carrying the window element 12a may be removed from the member 15 and subjected to sterilization as by immersion in a suitable sterilizing solution (or, if the element is of a heat-resistant nature, it may be heat-sterilized), and placed in position within the tube 15 after sterilization of the casing 1. The placement of the camera 6 within the compartment 3 will serve to secure the element 12a in proper place.

Figures 9, 10, 11:
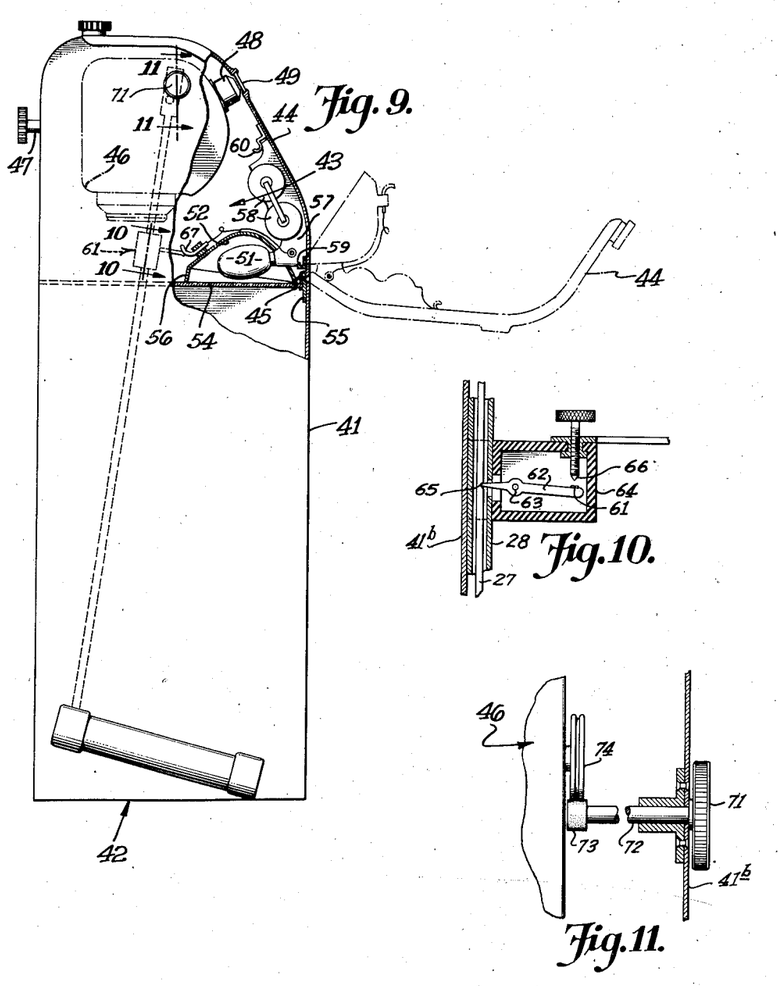
Fig. 9 is a view corresponding to Fig. 1, showing a further modified form of the invention.
Fig. 10 is a detail thereof, taken on line 10—10 in Fig. 9.
Fig. 11 is a further detail thereof, taken on line 11—11 in Fig. 9.

The form of device illustrated in Figs. 9–11 may comprise a casing 41 provided with an open lower end 42. At the upper end of the casing I provide a compartment 43 provided with a cover 44 hinged to the casing 41 as at 45. The camera 46 is adapted for positioning within the compartment 43 as in the case of camera 6, through positioning means indicated at 47. This embodiment illustrates the use of the camera finder as the photographic field-locating means, and the type of camera shown may comprise one such as illustrated in my above-identified issued patent, the eyepiece for the reflex viewing system being indicated at 48. An eye opening 49 is provided in the cover 44, in juxtaposition to said eyepiece 48, through which the operator may ascertain the photographic field of view.

A source of illumination for the subject to be photographed is indicated at 51, and may comprise a reflector and lamp assembly 52 carried upon a mount 53 secured to the cover 44. The wall means defining the compartment 43 may be comprised of a sheet of transparent glass or the like 54, suitably mounted on the casing 41 as at 55, and the reflector is conveniently provided with a depending light-shielding skirt or the like 56 which will prevent undue reflection of light into the camera lens system. The illumination-source 51 may be mounted upon a block 57 removably mounted upon the cover 44, which block may conveniently carry the batteries 58 which supply the operating current for the flash-bulb. The block 57 may be mounted on the cover 44 through the agency of a fixed detent 59 at the lower end and a snap detent 60 at the upper end.

A synchronized operation of the flash bulb in relation to the operation of the shutter means in the camera 46 may be obtained through the agency of contact means 61 associated with the pull rod 27 of the shutter-release mechanism (which may correspond to that shown in Figs. 1–4). In Fig. 10 I have illustrated a form of contact means, comprising a lever 62 pivotally mounted as at 63 on an insulated housing 64 mounted on the side wall 41b of the casing 41. The lever 62 is adapted to engage the pull rod 27 as at a notch 65, for rotation in a clockwise direction when the shutter release mechanism is operated. Such rotation of the lever 62 will cause the outer end thereof to engage an adjustable contact member 66, which is connected through lead 67 to the base-structure for the illuminating means. The electrical circuit may extend from one side of the batteries 58, through the flash bulb, through the lead 67 to contact 66, thence through lever 62 to ground at the pull rod 27. The opposite side of the batteries 58 will be grounded.

The camera casing may also be provided with an exteriorly disposed operating member for advancing the photographic film within the camera. Such a structure is illustrated in Fig. 11, comprising a knob 71 mounted on a shaft 72 rotatably mounted on the side wall 41b of the casing 41 and provided with a friction drive-wheel 73 at the inner end of the shaft positioned to engage the rim of the film-advancing knob 74 on the camera 46. It will be appreciated that the camera will preferably be provided with some convenient form of film metering means which will allow but a single "frame" of film to advance after each exposure.

The provision of a film advancing means exteriorly of the casing means will adapt the device to more universal use, as with an external source of illumination, or, if desired, by the employment of a more permanent source of light than the conventional "flash-bulb." If a repeating type of flash illuminator, or a steady source of light is employed, it will be apparent that a suitable sterilizable power-supply conduit from the position of the light to a source of power may be required. Numerous other modifications and adaptations of the structure will occur to those skilled in the art, wherefore, it will be appreciated, I do not choose to be limited to the specific features and construction herein delineated and described, but rather to the scope of the sub-joined claims.

I claim:

1. A photographic device adapted for medicosurgical use in association with a camera, and comprising: a sterilizable housing provided with means defining a compartment adapted to receive such a camera and including means defining a transparent photographic aperture through which said camera is adapted to perform a photographic operation along a given photographic axis, said compartment being adapted also to receive an illumination source, and said compartment defining means including a window member placed in light-transmitting relation to said illumination source whereby the photographic subject is illuminated during such photographic operation; sighting means associated with said housing whereby the field of view of said camera can be determined from a position externally of said housing, and camera operating means associated with said housing and having a portion extending exteriorly thereof whereby said camera can be caused to perform such photographic operation.

2. A photographic device adapted for medicosurgical use in association with a camera, and comprising: a sterilizable housing provided with means defining a compartment adapted to receive such a camera and including means defining a transparent photographic aperture through which said camera is adapted to perform a photographic operation along a given photographic axis, said housing being elongated in the direction of said photographic axis; sighting means associated with said housing whereby the field of view of said camera can be determined from a position externally of said housing; camera operating means associated with said housing and having a portion extending exteriorly thereof whereby said camera can be caused to perform such photographic operation; support means for said device comprising handle means at one end of said housing at two opposite lateral sides thereof, and a head rest at the other end of said housing at the side thereof intermediate said two opposite lateral sides.

3. A photographic construction adapted for use in the recording of photographic subjects under conditions such that a high degree of sterility with respect to said subject is maintained, which comprises: an elongated casing formed of heat-resistant material and provided with an opening at one end generally defining a picture area; wall means extending across said casing adjacent the other end thereof defining a compartment at said other end, said wall means including light-transmitting window means formed of sterilizable material, said window means including a transparent portion associated with said camera objective through which the desired picture is taken and another portion positioned solely for transmission of light from said light source towards said picture area; a shielding member extending from said wall means into position to be engaged by said camera between said window portions to prevent light reflected from said other window portion from entering said camera through said objective; door means for said compartment providing access thereto from the exterior of said casing; positioning means associated with said casing and adapted to receive a camera device provided with an objective, a shutter release mechanism and a synchronized subject-illuminating light source and position the same within said compartment with respect to said transparent window means whereby the objective of said camera device will photographically subtend said picture area and said light source will be positioned for illumination of said picture area; and release means mounted on said casing extending exteriorly thereof and provided with operating means extending within said compartment in position to engage said camera shutter release mechanism to cause operation of said camera and the associated synchronized light source.

4. A photographic device which comprises: an elongated casing provided with side walls and an opening at one end; wall means extending transversely across said casing and defining a compartment at the other end; door means for said compartment; a transparent window member in said wall means; positioning means within said compartment adapted to receive and secure a camera within said compartment in position to photographically subtend a portion of said opening through said transparent window member; said casing being provided with a sighting opening along one side thereof extending from adjacent the position of said wall means toward said one end; head rest means positioned adjacent the other end of said casing at the side thereof at which said sighting opening is located, and the portion of the casing side wall between said sighting opening and said one end of said casing being inclined outwardly towards said other end, said outwardly inclined side wall portion being adapted to define a line of sight for an operator having his head resting against said head rest and establish the boundary of the picture area of said camera nearest the operator.

5. A photographic device which comprises: an elongated casing provided with side walls and an opening at one end; wall means extending transversely across said casing and defining a compartment at the other end; door means for said compartment; a transparent window member in said wall means; positioning means within said compartment adapted to receive and secure a camera within said compartment in position to photographically subtend a portion of said opening through said transparent window member; said casing being provided with a sighting opening along one side thereof extending from adjacent the position of said wall means toward said one end; head rest means positioned adjacent the other end of said casing at the side thereof at which said sighting opening is located, and the portion of the casing side wall between said sighting opening and said one end of said casing being inclined outwardly towards said other end, said outwardly inclined portion being adapted to define a line of sight for an operator having his forehead resting against said head rest and establish the boundary of the picture area of said camera nearest the operator, said casing being further provided with index means adjacent the open end thereof spaced from said inclined side wall portion in position to establish the boundary of the picture area of said camera farthest from such operator.

6. A photographic device which comprises: an elongated casing provided with side walls and an opening at one end; wall means extending transversely across said casing and defining a compartment at the other end; door means for said compartment; a transparent window member in said wall means; and positioning means within said compartment adapted to receive and secure a camera within said compartment in position to photographically subtend a portion of said opening through said transparent window member, said camera having a light source associated therewith and adapted to be positioned within said compartment, said wall means also including a transparent area positioned to transmit light from said light source towards said end of said casing; said casing being provided with a sighting opening along one side thereof extending from adjacent the position of said wall means towards said one end, and comprising in addition, head rest means positioned adjacent the other end of said casing at the side thereof at which said sighting opening is located, and the portion of the casing side wall between said sighting opening and said one end of said casing being inclined outwardly towards said other end, said outwardly inclined side wall portion being adapted to define a line of sight for an operator having his head resting against said head rest and establish the boundary of the picture area of said camera nearest the operator.

7. A photographic device which comprises: an elongated casing provided with side walls and an opening at one end; wall means extending transversely across said casing and defining a compartment at the other end; door means for said compartment; a transparent window member in said wall means; and positioning means within said compartment adapted to receive and secure a camera within said compartment in position to photographically subtend a portion of said opening through said transparent window member, said camera having a light source associated therewith and adapted to be positioned within said compartment, said wall means also including a transparent area positioned to transmit light from said light source towards said end of said casing; said casing being provided with a sighting opening along one side thereof extending from adjacent the position of said wall means towards said one end, and comprising in addition, head rest means positioned adjacent the other end of said casing at the side thereof at which said sighting opening is located, and the portion of the casing side wall between said sighting opening and said one end of said casing being inclined outwardly towards said other end, said outwardly inclined portion being adapted to define a line of sight for an operator having his forehead resting against said head rest and establish the boundary of the picture area of said camera nearest the operator, said casing being further provided with index means adjacent the open end thereof spaced from said inclined side wall portion in position to establish the boundary of the picture area of said camera farthest from such operator.

8. A photographic construction adapted for use in the recording of photographic subjects under conditions such that a high degree of sterility with respect to said subject is maintained, which comprises: an elongated casing formed of heat-resistant material and provided with an opening at one end generally defining a picture area; wall means extending across said casing adjacent the other end thereof defining a compartment at said other end, said wall means including transparent window means formed of sterilizable material; door means for said compartment providing access thereto from the exterior of said casing; positioning means associated with said casing and adapted to receive a camera device, provided with an objective, a shutter release mechanism and a synchronized subject-illuminating light source, and position the same within said compartment with respect to said transparent window means whereby the objective of said camera device will photographically subtend said picture area and said light source will be positioned for illumination of said picture area; release means mounted on said casing extending exteriorly thereof and provided with operating means extending within said compartment in position to engage said camera shutter release mechanism to cause operation of said camera and the associated synchronized light source; said casing being provided with a sighting opening along one side thereof extending from adjacent the position of said wall means towards said one end; and head rest means positioned adjacent the other end of said casing at the side thereof at which said sighting opening is located, and the portion of the casing side wall between said sighting opening and said one end of said casing being inclined outwardly towards said other end, said outwardly inclined side wall portion being adapted to define a line of sight for an operator having his head resting against said head rest and establish the boundary of the picture area of said camera nearest the operator.

9. A photographic construction adapted for use in the recording of photographic subjects under conditions such that a high degree of sterility with respect to said subject is maintained, which comprises: an elongated casing formed of heat-resistant material and provided with an opening at one end generally defining a picture area; wall means extending across said casing adjacent the other end thereof defining a compartment at said other end, said wall means including transparent window means formed of sterilizable material; door means for said compartment providing access thereto from the exterior of said casing; positioning means associated with said casing and adapted to receive a camera device, provided with an objective, a shutter release mechanism and a synchronized subject-illuminating light source, and position the same within said compartment with respect to said transparent window means whereby the objective of said camera device will photographically subtend said picture area and said light source will be positioned for illumination of said picture area; release means mounted on said casing extending exteriorly thereof and provided with operating means extending within said compartment in position to engage said camera shutter release mechanism to cause operation of said camera and the associated synchronized light source; said casing being provided with a sighting opening along one side thereof extending from adjacent the position of said wall means towards said one end; and head rest means positioned adjacent the other end of said casing at the side thereof at which said sighting opening is located, and the portion of the casing side wall between said sighting opening and said one end of said casing being inclined outwardly towards said other end, said outwardly inclined portion being adapted to define a line of sight for an operator having his forehead resting against said head rest and establish the boundary of the picture area of said camera nearest the operator, said casing being further provided with index means adjacent the open end thereof spaced from said inclined side wall portion in position to establish the boundary of the picture area of said camera farthest from such operator.

10. A photographic construction adapted for use in the recording of photographic subjects under conditions such that a high degree of sterility with respect to said subject is maintained which comprises: an elongated casing formed of heat-resistant material and provided with an opening at one end generally defining a picture area; wall means extending across said casing adjacent the other end thereof defining a compartment at said other end, said wall means including transparent window means formed of sterilizable material; door means for said compartment providing access thereto from the exterior of said casing; positioning means associated with said casing and adapted to receive a camera device, provided with an objective and shutter release mechanism, and position the same within said compartment with respect to said transparent window means whereby the objective of said camera device will photographically subtend said picture area; and release means mounted on said casing extending exteriorly thereof and provided with operating means extending within said compartment in position to engage said camera shutter release mechanism, said casing being provided with a sighting opening along one side thereof extending from adjacent the position of said wall means towards said one end, and comprising in addition; head rest means positioned adjacent the other end of said casing at the side thereof at which said sighting opening is located, and the portion of the casing side wall between said sighting opening and said one end of said casing being inclined outwardly towards said other end, said outwardly inclined side wall portion being adapted to define a line of sight, having his forehead resting against said head rest and establish the boundary of the picture area of said camera nearest the operator.

GORDON B. POLLOCK.

REFERENCES CITED

The following references are of record in the file of this patent:

UNITED STATES PATENTS

| Number | Name | Date |
|---|---|---|
| 1,270,280 | Folmer | June 25, 1918 |
| 1,589,436 | Seebold | June 22, 1926 |
| 1,645,923 | Ohlau | Oct. 18, 1927 |
| 1,662,227 | Allyn | Mar. 13, 1928 |
| 1,803,347 | Owens | May 5, 1931 |
| 1,963,417 | Petit et al. | June 19, 1934 |
| 2,068,699 | Petersen | Jan. 26, 1937 |
| 2,129,001 | Goehner | Sept. 6, 1938 |
| 2,180,007 | Hopkins | Nov. 14, 1939 |
| 2,185,508 | Kunze | Jan. 2, 1940 |
| 2,224,564 | De Silva | Dec. 10, 1940 |